(12) United States Patent
Minardi et al.

(10) Patent No.: US 7,514,161 B2
(45) Date of Patent: Apr. 7, 2009

(54) LAMINATED ANTIFERROMAGNETICALLY COUPLED MEDIA WITH DECOUPLED MAGNETIC LAYER

(75) Inventors: Mary Frances Minardi, Santa Cruz, CA (US); Mohammad Mirzamaani, San Jose, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 516 days.

(21) Appl. No.: 11/058,538

(22) Filed: Feb. 15, 2005

(65) Prior Publication Data

US 2006/0183003 A1      Aug. 17, 2006

(51) Int. Cl.
    *G11B 5/66*        (2006.01)
(52) U.S. Cl. ............... 428/828; 428/828.1; 428/836.1; 360/135
(58) Field of Classification Search ............... None
    See application file for complete search history.

(56) References Cited

U.S. PATENT DOCUMENTS

| | | | | |
|---|---|---|---|---|
| 6,077,586 | A * | 6/2000 | Bian et al. | 428/828 |
| 6,623,875 | B2 | 9/2003 | Inomata et al. | |
| 6,656,613 | B2 * | 12/2003 | Litvinov et al. | 428/827 |
| 6,773,834 | B2 * | 8/2004 | Do et al. | 428/828 |
| 6,811,890 | B1 * | 11/2004 | Zhou et al. | 428/828.1 |
| 6,821,652 | B1 * | 11/2004 | Okamoto et al. | 428/828.1 |
| 6,893,735 | B2 * | 5/2005 | Acharya et al. | 428/611 |
| 2002/0132139 | A1 | 9/2002 | Chang et al. | |
| 2002/0160234 | A1 | 10/2002 | Sakawaki et al. | |
| 2003/0152805 | A1 | 8/2003 | Bertero et al. | |
| 2005/0019609 | A1 * | 1/2005 | Tang | 428/694 TM |

FOREIGN PATENT DOCUMENTS

| | | |
|---|---|---|
| JP | 2002245610 | 8/2002 |
| WO | WO03083841 | 10/2003 |

OTHER PUBLICATIONS

Jack J.K. Chang et al, "SNR and KuV/kT Improvement using CoCrTa/Ru/CoCrPtTaB/CoCrTaB AFC Media," 2003 IEEE.
"X-rays Unravel the Puzzle of Exchange Bias", http://www-ssrl.slac.stanford.edu/stohr/magneticexchange.htm, Dec. 10, 2007.

* cited by examiner

*Primary Examiner*—Kevin M Bernatz
(74) *Attorney, Agent, or Firm*—Kunzler & McKenzie

(57) ABSTRACT

A laminated film structure is disclosed comprising multiple ferromagnetic layers achieving improved data recording performance. A non-magnetic spacer layer is disposed between an upper ferromagnetic layer and an antiferromagnetic coupled (AFC) structure. The AFC structure is comprised of a ferromagnetic layer and an antiferromagnetic slave layer. The ferromagnetic layer in the AFC structure, referred to as lower ferromagnetic layer, may contain tantalum to promote chromium segregation at the grain boundaries to achieve magnetic decoupling of the grains with relatively thin boundaries, improving medium signal-to-noise ratio while maintaining good thermal stability of the medium. In some embodiments, the interlayer is a five-element alloy such as a CoCrPtBTa alloy.

12 Claims, 2 Drawing Sheets

LAMINATED ANTIFERROMAGNETICALLY COUPLED MEDIA WITH DECOUPLED MAGNETIC LAYER

BACKGROUND OF THE INVENTION

1. Field of the Invention

This invention relates generally to laminated magnetic thin films for magnetic recording and more particularly to magnetic thin films having multiple de-coupled ferromagnetic layers.

2. Description of the Related Art

A typical head and disk system 100 illustrated in FIG. 1 may include a magnetic transducer 102 supported by a suspension 104 as it flies above the disk 106. The magnetic transducer 102, usually called a "read/write head" or "slider," may include elements that perform the task of writing magnetic transitions (the write head 108) and reading the magnetic transitions (the read head 110). The electrical signals to and from the read and write heads 110, 108 travel along conductive paths (leads) 112 which are attached to or embedded in the suspension 104. The magnetic transducer 102 is positioned over points at varying radial distances from the center of the disk 106 to read and write circular tracks (not shown). The disk 106 is attached to a spindle 114 that is driven by a spindle motor 116 to rotate the disk 106. The disk 106 comprises a substrate 118 on which a laminate 120 having multiple layers is deposited. The laminate 120 typically includes ferromagnetic layers in which the write head 108 records the magnetic transitions in which information is encoded.

Extremely small regions, or bits, on the ferromagnetic layers are selectively magnetized in chosen directions in order to store data on the disk 106. To increase the amount of data that can be stored on the disks 106 the number of bits per unit area, storage density, must be increased.

As the storage density of magnetic recording disks has increased, the product of the remanent magnetization Mr (the magnetic moment per unit volume of ferromagnetic material) and the magnetic layer thickness t has decreased. Similarly, the coercive field or coercivity ($H_c$) of the magnetic layer has increased. This has led to a decrease in the ratio Mrt/$H_c$. To achieve the reduction in Mrt, the thickness t of the magnetic layer can be reduced, but only to a limit because the layer will exhibit increasing magnetic decay, which has been attributed to thermal activation of small magnetic grains (the superparamagnetic effect). The thermal stability of a magnetic grain is to a large extent determined by $K_u V$, where $K_u$ is the magnetic anisotropy constant of the layer and V is the volume of the magnetic grain. As the layer thickness is decreased, V decreases. If the layer thickness is too thin, the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u$/Mr, becomes too great to be written by a conventional recording head. A similar approach is to reduce the Mr of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

It is known that substantially improved SNR can be achieved by the use of a laminated magnetic layer of two (or more) separate magnetic layers that are spaced apart by a nonmagnetic spacer layer. This discovery was made by S. E. Lambert, et al., "Reduction of Media Noise in Thin Film Metal Media by Lamination", IEEE Transactions on Magnetics, Vol. 26, No. 5, September 1990, pp. 2706-2709, and subsequently patented in IBM's U.S. Pat. No. 5,051,288. The reduction in intrinsic media noise by lamination is believed due to a decoupling of the magnetic interaction or exchange coupling between the magnetic layers in the laminate. The use of lamination for noise reduction has been extensively studied to find the favorable spacer layer materials, including Cr, CrV, Mo and Ru, and spacer thicknesses, from 5 to 400 angstrom, that result in the best decoupling of the magnetic layers, and thus the lowest media noise. This work has been reported in papers by E. S. Murdock, et al., "Noise Properties of Multilayered Co-Alloy Magnetic Recording Media", IEEE Transactions on Magnetics, Vol. 26, No. 5, September 1990, pp. 2700-2705; A. Murayama, et al., "Interlayer Exchange Coupling in Co/Cr/Co Double-Layered Recording Films Studied by Spin-Wave Brillouin Scattering", IEEE Transactions on Magnetics, Vol. 27, No. 6, November 1991, pp. 5064-5066; and S. E. Lambert, et al., "Laminated Media Noise for High Density Recording", IEEE Transactions on Magnetics, Vol. 29, No. 1, January 1993, pp. 223-229. U.S. Pat. No. 5,462,796 and the related paper by E. Teng et al., "Flash Chromium Interlayer for High Performance Disks with Superior Noise and Coercivity Squareness", IEEE Transactions on Magnetics, Vol. 29, No. 6, November 1993, pp. 3679-3681, describe a laminated low-noise disk that uses a discontinuous Cr film that is thick enough to reduce the exchange coupling between the two magnetic layers in the laminate but is so thin that the two magnetic layers are not physically separated.

Increased storage density while maintaining good thermal stability may be achieved by two ferromagnetic films antiferromagnetically coupled together across a nonferromagnetic spacer film. Some laminates may include two ferromagnetic films decoupled from one another and a third ferromagnetic film antiferromagnetically coupled to one of the ferromagnetic films. The third film is typically referred to as the antiferromagnetic slave layer. Because the magnetic moments of the two antiferromagnetically-coupled films are oriented antiparallel, the net remnant Mrt of the ferromagnetic layers is reduced by the Mrt of the antiferromagnetic slave layer. This reduction in Mrt is accomplished without a reduction in the thermal stability of the recording medium because the volumes of the grains in the antiferromagnetically-coupled films add constructively. The medium also enables much sharper magnetic transitions to be achieved with reduced demagnetization fields, resulting in a higher linear bit density for the medium.

In view of the foregoing it is clear that laminated magnetic thin films for magnetic recording must have a high signal-to-noise ratio. Accordingly, it would be advancement in the art to provide a laminated magnetic thin film with increased the signal-to-noise ratio compared to currently available media having multiple ferromagnetic layers with or without antiferromagnetically coupled layers.

SUMMARY OF THE INVENTION

The present invention has been developed in response to the present state of the art, and in particular improves the signal-to-noise ratio (SNR) of multiple ferromagnetic layer thin film laminates both with and without antiferromagnetic coupling. In some embodiments, a laminate may include an upper ferromagnetic layer located closest to the magnetic transducer, a lower ferromagnetic layer located beneath the upper layer, and a antiferromagnetic slave layer beneath the lower ferromagnetic layer. A spacer layer may be disposed between the upper and lower ferromagnetic layers and serve to decouple the upper and lower ferromagnetic layers. An antiferromagnetic coupling layer may be disposed between the lower ferromagnetic layer and the antiferromagnetic slave layer and serve to antiferromagnetically couple the lower ferromagnetic layer and the antiferromagnetic slave layer.

The lower ferromagnetic layer may comprise an alloy having magnetically decoupled grains. In one embodiment decoupling may be achieved by using an alloy having chromium enriched boundary regions. The presence of chromium in the boundary regions is known to decouple grains. Other elements, such as boron, are known to decouple grains but result in amorphous nonmagnetic boundary regions, which effectively reduce the size of the grains resulting in reduced thermal stability. In some embodiments, the lower ferromagnetic alloy may contain amounts of tantalum which causes chromium to come out of solid state solution inside grains and collect at grain boundaries. In one embodiment the alloy used for the lower ferromagnetic layer is a five-element alloy having tantalum as one of its constituents. In the illustrated embodiment, the five-element alloy is $CoPt_{13}Cr_{20}B_5Ta_1$ (i.e., 13 atomic percent (13 at. %) Pt, 20 at. % Cr, 5 at. % B, 1 at. % Ta, with the balance being Co). Experiments conducted by the inventors have shown use of this alloy significantly increases SNR without decreasing thermal stability.

In some embodiments, the lower ferromagnetic layer may also have a lower coercivity than the upper ferromagnetic layer. The lower coercivity may conform to the lower intensity magnetic field that reaches the lower ferromagnetic layer from the magnetic transducer 102.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
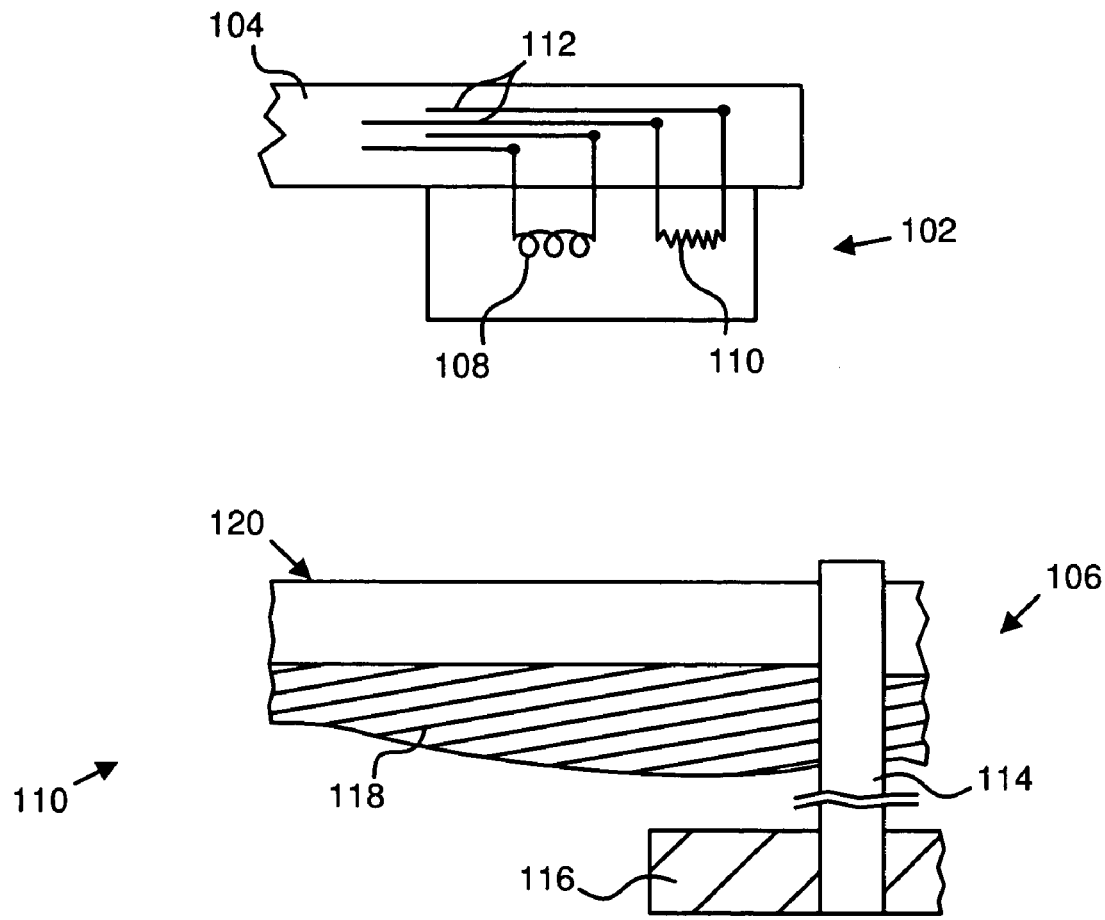
FIG. 1 is a schematic representation of one embodiment of a read/write head and recording medium of the prior art.

Referring to FIG. 1, a typical prior art head and disk system 100 may include a magnetic transducer 102 supported by a suspension 104 as it flies above the disk 106. The magnetic transducer 102, usually called a "read/write head" or "slider," may include elements that perform the task of writing magnetic transitions (the write head 108) and reading the magnetic transitions (the read head 110). The electrical signals to and from the read and write heads 110, 108 travel along conductive paths (leads) 112 which are attached to or embedded in the suspension 104. The magnetic transducer 102 is positioned over points at varying radial distances from the center of the disk 106 to read and write circular tracks (not shown). The disk 106 is attached to a spindle 114 that is driven by a spindle motor 116 to rotate the disk 106. The disk 106 comprises a substrate 118 on which a laminate 120 having multiple layers is deposited. The laminate 120 may include ferromagnetic layers in which the write head 108 records the magnetic transitions in which information is encoded.

Figure 2:
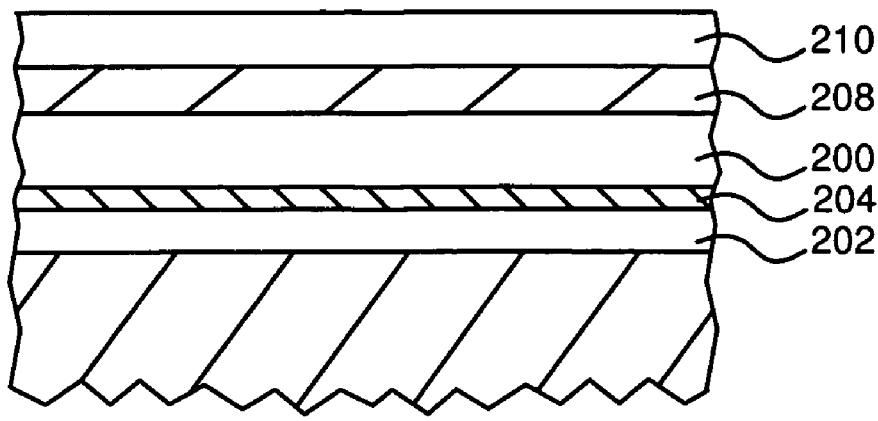
FIG. 2 is an illustration of one embodiment of the layer structure of a laminated magnetic thin film medium of the prior art invention.

Referring to FIG. 2, the laminate 120 may include a preseed layer 202, a seed layer 204, one or more under layers 206, magnetic layers 208, and an overcoat 210. The preseed layer 202 and seed layer 204 may provide a crystalline growth template upon which underlayer 206 can grow in the correct (200) orientation with small grain size, which further provides a growth template for the ferromagnetic layers to growth in (11.0) orientation with small grain size. The overcoat 210 may be a diamond-like carbon or silicon nitride layer protecting the magnetic layers 208 from abrasion or corrosion. In the illustrated embodiment, the preseed layer 202 is embodied as $CrTi_{50}$ and the seed layers 204 is embodied as RuAl layer and the underlayer is embodied as $CrTi_{20}$.

Figure 3:
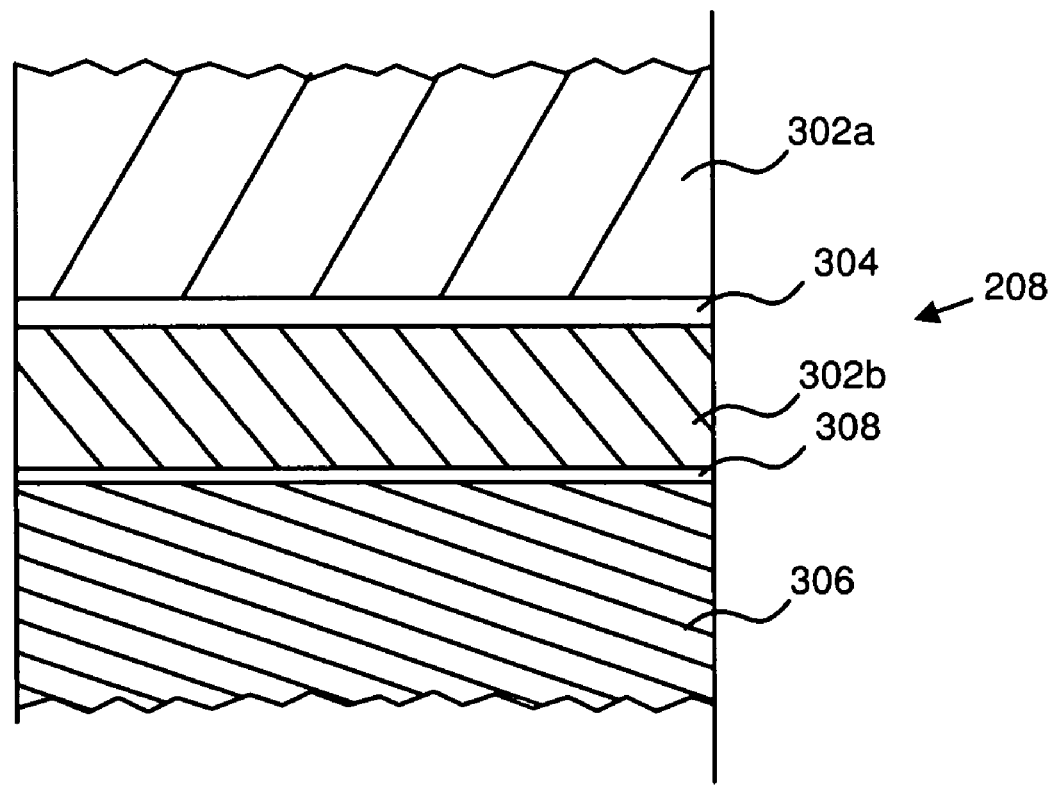
FIG. 3 is an illustration of one embodiment of a layer structure for ferromagnetic layers and an anti-ferromagnetic slave layer comprising a laminated magnetic thin film medium of the present invention.

Referring to FIG. 3, the magnetic layer 208 may include one or more ferromagnetic layers 302a, 302b. The ferromagnetic layers will typically be locally magnetized by the transducer 102 in order to write data to the disk 106. The ferromagnetic layers 302a, 302b will typically have high coercivity ($H_c$) and thermal stability in order to improve retention of data written thereto. In some embodiments, the ferromagnetic layer 302b located beneath the ferromagnetic layer 302a may have a lower coercivity than the layer 302a in order to conform to the weaker magnetic field from the transducer 102 reaching the ferromagnetic layer 302b due to layer 302b's increased distance from the transducer 102. A more detailed description of ferromagnetic layers having varied magnetic anisotropies can be found in U.S. patent application Ser. No. 10/628,011, filed Jul. 23, 2004 and entitled MAGNETIC ANISOTROPY ADJUSTED LAMINATED MAGNETIC THIN FILMS FOR MAGNETIC RECORDING, which is incorporated herein by reference.

In the illustrated embodiment, the ferromagnetic layers 302a, 302b are cobalt based ferromagnetic alloys. The upper ferromagnetic layer 302a may have the composition $CoPt_{13}Cr_{19}B_7$. The lower ferromagnetic layer 302b may have the composition $CoPt_{13}Cr_{20}B_5Ta_1$.

A spacer layer 304 may be interposed between the ferromagnetic layers 302a, 302b in order to decouple the layers 302a, 302b. Decoupling may be desirable to ensure that the magnetic grains forming the ferromagnetic layers 302a, 302b act independently. In order to store greater amounts of data, the number of grains per unit area, or grain density, may be increased. However, coupling between grains may result in grains acting collectively as one magnetic unit when changing the direction of magnetization. This coupling reduces effective magnetic grain density. Accordingly, decoupling the grains to ensure magnetic decorrelation may result in an increased magnetic grain density.

The spacer layer 304 may therefore comprise any material serving to decouple the ferromagnetic layers 302a, 302b. In the illustrated embodiment, the spacer layer is ruthenium having a thickness resulting in decoupling of the ferromagnetic layers 302a, 302b.

In some embodiments an antiferromagnetic slave layer 306 may be used to reduce the effective magnetization-thickness product ($M_rt$) of the film. In the illustrated embodiment, the antiferromagnetic slave layer 306 has the composition $CoCr_{10}$. An antiferromagnetic coupling layer 308 may be interposed between the lower ferromagnetic layer 302b and the antiferromagnetic slave layer 306. In the illustrated embodiment, the antiferromagnetic coupling layer 308 is ruthenium having a thickness chosen to achieve antiferromagnetic coupling.

Reduction of grain size and decoupling of the grains provide a pathway to continuous improvement of the signal-to-noise ratio of magnetic media. However, accompanying these microstructural changes is a degradation of medium thermal stability. This is pronounced for laminated media since the upper ferromagnetic layer and the lower ferromagnetic layer are decoupled from each other, and therefore, need to be individually stable. To alleviate such degradation, an element selected to improve grain decoupling such as Ta may be included in the composition of the lower ferromagnetic layer. Ta is known to push Cr to the grain boundaries from inside the grains. With such Cr enrichment at the grain boundaries, the grains are well decoupled without significant increase in B content, which would result in significant increase of thickness of amorphous grain boundaries and refinement of grain size. As a result, medium signal-to-noise ratio can be improved without sacrificing thermal stability.

Table 1 compares signal-to-noise ratios at different linear recording densities (measured in kilo flux changes per inch or "kfci") of two media, Medium 1 with CoPtCrBTa as the lower ferromagnetic layer according to this invention and Medium 2 with CoPtCrB as the lower ferromagnetic layer in prior art. Medium 1 has significantly higher SNR than Medium 2 by 0.3-0.5 dB across all densities in the measurement. The signal-to-noise ratio decay of the two media is equivalent as indicated in Table 2.

TABLE 1

Signal to noise ratio v. recording density.

| | Recording Density (kfci) | | | | |
|---|---|---|---|---|---|
| | 0 | 200 | 400 | 600 | 800 |
| CoCrPtBTa | 33.8 | 31.7 | 30.7 | 30.2 | 29.7 |
| CoCrPtB | 33.5 | 31.4 | 30.4 | 29.7 | 29.3 |

Experiments conducted by the inventors have shown that the thermal stability of the CoCrPtBTa alloy is preserved, notwithstanding the decoupling of the grains. The CoCrPtBTa alloy has been found to have a signal-to-noise ratio decay of 1.7% per decade (a measure of thermal stability) which is equal to the decay of the CoCrPtB alloy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A laminate for use with a magnetic recording head comprising:
   an upper ferromagnetic layer;
   a lower ferromagnetic layer comprising an alloy selected to promote grain decoupling, the lower ferromagnetic layer comprising about 1 atomic percent tantalum;
   a nonmagnetic spacer layer magnetically decoupling the upper and lower ferromagnetic layers, wherein the nonmagnetic spacer layer is disposed directly adjacent to both the upper ferromagnetic layer and the lower ferromagnetic layer such that the nonmagnetic spacer layer is located between the upper ferromagnetic layer and the lower ferromagnetic layer, the upper ferromagnetic layer having a coercivity greater than the coercivity of the lower ferromagnetic layer; and
   a slave layer disposed below the lower ferromagnetic layer.

2. The laminate of claim 1, further comprising:
   a coupling layer disposed between the lower ferromagnetic layer and the slave layer.

3. The laminate of claim 1, wherein the lower ferromagnetic layer further comprises a five-element ferromagnetic alloy comprising about 13 atomic percent platinum, about 20 atomic percent chromium, about 5 atomic percent boron.

4. The laminate of claim 1, wherein the lower ferromagnetic layer comprises grains having chromium rich boundary regions.

5. The laminate of claim 1, wherein the nonmagnetic spacer layer comprises ruthenium.

6. The laminate of claim 5, wherein the upper ferromagnetic alloy is a quaternary alloy.

7. A laminate for use with a magnetic recording head comprising:
   an upper ferromagnetic layer;
   a lower ferromagnetic layer comprising grains having chromium enriched boundary regions, the lower ferromagnetic layer comprising about 13 atomic percent platinum, about 20 atomic percent chromium, about 5 atomic percent boron, and about 1 atomic percent tantalum; and a nonmagnetic spacer layer magnetically decoupling the upper and lower ferromagnetic layers, the nonmagnetic spacer layer disposed directly adjacent to both the upper ferromagnetic layer and the lower ferromagnetic layer such that the nonmagnetic spacer layer is located between the upper ferromagnetic layer and the lower ferromagnetic layer, the upper ferromagnetic layer having a coercivity greater than the coercivity of the lower ferromagnetic layer.

8. The laminate of claim 7, wherein the lower ferromagnetic layer comprises a five-element alloy.

9. The laminate of claim 7, further comprising:
a slave layer disposed beneath the lower ferromagnetic layer; and
an antiferromagnetically coupling layer disposed between the slave layer and the lower ferromagnetic layer.

10. A recording device comprising
a rotating medium having at least one surface bearing a laminate, the laminate comprising:
an upper ferromagnetic layer;
a lower ferromagnetic layer having decoupled grains, the lower ferromagnetic layer comprising about 13 atomic percent platinum, about 20 atomic percent chromium, about 5 atomic percent boron, and about 1 atomic percent tantalum;
a nonmagnetic layer disposed between the upper ferromagnetic layer and the lower ferromagnetic layer, the nonmagnetic spacer layer disposed directly adjacent to both the upper ferromagnetic layer and the lower ferromagnetic layer, the nonmagnetic layer magnetically decoupling the upper ferromagnetic layer and the lower ferromagnetic layer, the upper ferromagnetic layer having a coercivity greater than the coercivity of the lower ferromagnetic layer; and a read/write head for reading and writing signals to the rotating medium; and
a motor for spinning the rotating medium.

11. The recording device of claim 10, wherein the lower ferromagnetic layer is a five-element alloy comprising tantalum.

12. A laminate for use with a magnetic recording head comprising:
an upper ferromagnetic layer;
a lower ferromagnetic layer comprising a five-element alloy having chromium enriched boundary regions, the lower ferromagnetic layer comprising about 13 atomic percent platinum, about 20 atomic percent chromium, about 5 atomic percent boron, and about 1 atomic percent tantalum;
a nonmagnetic spacer layer magnetically decoupling the upper and lower ferromagnetic layers, wherein the nonmagnetic spacer layer is disposed directly adjacent to both the upper ferromagnetic layer and the lower ferromagnetic layer such that the nonmagnetic spacer layer is located between the upper ferromagnetic layer and the lower ferromagnetic layer, the upper ferromagnetic layer having a coercivity greater than the coercivity of the lower ferromagnetic layer;
an slave layer disposed beneath the lower ferromagnetic layer; and
an antiferromagnetically coupling layer disposed between the slave layer and the lower ferromagnetic layer.

* * * * *